United States Patent [19]

Davison, Jr.

[11] Patent Number: 4,489,597
[45] Date of Patent: Dec. 25, 1984

[54] VEHICLE DRIVE TRAIN TEST APPARATUS

[75] Inventor: Ellard D. Davison, Jr., Grosse Pointe Farms, Mich.

[73] Assignee: General Motors Corporation, Detroit, Mich.

[21] Appl. No.: 512,024

[22] Filed: Jul. 8, 1983

[51] Int. Cl.³ .......................................... G01M 15/00
[52] U.S. Cl. .................................................... 73/118
[58] Field of Search ............ 73/118, 162, 862, 862.09, 73/862.17

[56] References Cited

U.S. PATENT DOCUMENTS

| | | |
|---|---|---|
| 2,130,833 | 9/1938 | Bennett . |
| 2,130,900 | 9/1938 | Presbrey . |
| 3,289,471 | 12/1966 | Maxwell ................................ 73/117 |
| 3,330,153 | 7/1967 | Perna, Jr. ............................. 73/116 |
| 3,451,262 | 6/1969 | McPeek et al. ...................... 73/118 |
| 3,712,127 | 1/1973 | Petersen .............................. 73/118 |
| 4,062,234 | 12/1977 | Bartlett, Jr. et al. . |
| 4,391,131 | 7/1983 | Scourtes ........................... 73/162 X |

Primary Examiner—Jerry W. Myracle
Attorney, Agent, or Firm—R. L. Phillips

[57] ABSTRACT

Vehicle drive train apparatus is disclosed having a fixed single ratio overdrive and a selective dual-ratio overdrive connecting the axles of a differential to drive a dynamometer while simulating vehicle straight line drive with no differential gear action and, alternatively, vehicle turning with certain limited differential gear action.

2 Claims, 2 Drawing Figures

VEHICLE DRIVE TRAIN TEST APPARATUS

This invention relates to test apparatus for vehicle drive trains having a differential and more particularly to the use of a single dynamometer to test a vehicle drive train either with or without differential gear action.

Common practice in the testing of a vehicle drive train having a differential is to employ two dynamometers where differential action is required. The use of a dynamometer on each axle shaft to obtain differential gear action is complicated and costly particularly where a drive train unit such as an automatic transaxle is desired to be cyclically operated with and without differential gear action to qualify an automatic transmission fluid used both in the transmission and differential.

The test apparatus according to the present invention simply, efficiently and inexpensively utilizes a single dynamometer to test a vehicle drive train such as an automatic transaxle with or without differential gear action. In the preferred embodiment, the test apparatus comprises a shaft that is connected to drive the single dynamometer and is adapted to extend alongside and past the automatic transaxle parallel to its oppositely extending coaxial axle shafts. A single ratio overdrive arrangement is then adapted to connect one of the axle shafts to drive the parallel shaft with a predetermined overdrive ratio. On the other hand, a selectively engageable multi-ratio overdrive arrangement is adapted to selectively connect the other axle shaft to drive the parallel shaft with an overdrive ratio equal to or matching the first-mentioned overdrive ratio and, alternatively, with a different overdrive ratio. The single dynamometer is thus connectable to be driven by the transaxle at a faster speed than the axles with both matched and mismatched overdrives from the axles. The equal-ratio overdrives simulate a vehicle being driven by the drive train in a straight line (no differential gear action) with both axles then turning at the same speed. On the other, simulated vehicle turning (differential gear action) is effected by the mismatched overdrives with each axle then forced to turn at a different speed but with the dynamometer still driven at a higher speed thereby. This arrangement is thus advantageous apart from requiring only a single dynamometer in that the use of overdrives in both modes operates to increase the speed and decrease the torque to the dynamometer thereby enabling same to absorb high horsepower. In addition, the decrease in torque on the shaft to the dynamometer permits reducing the size of this shaft and the other drive system components. Another feature of the test apparatus is that a drive train unit such as an automatic transaxle can be installed and removed without disturbing the engine and drive system.

These and other advantages, features and objectives of the present invention will become more apparent from the following description and drawing in which.

Figure 1:
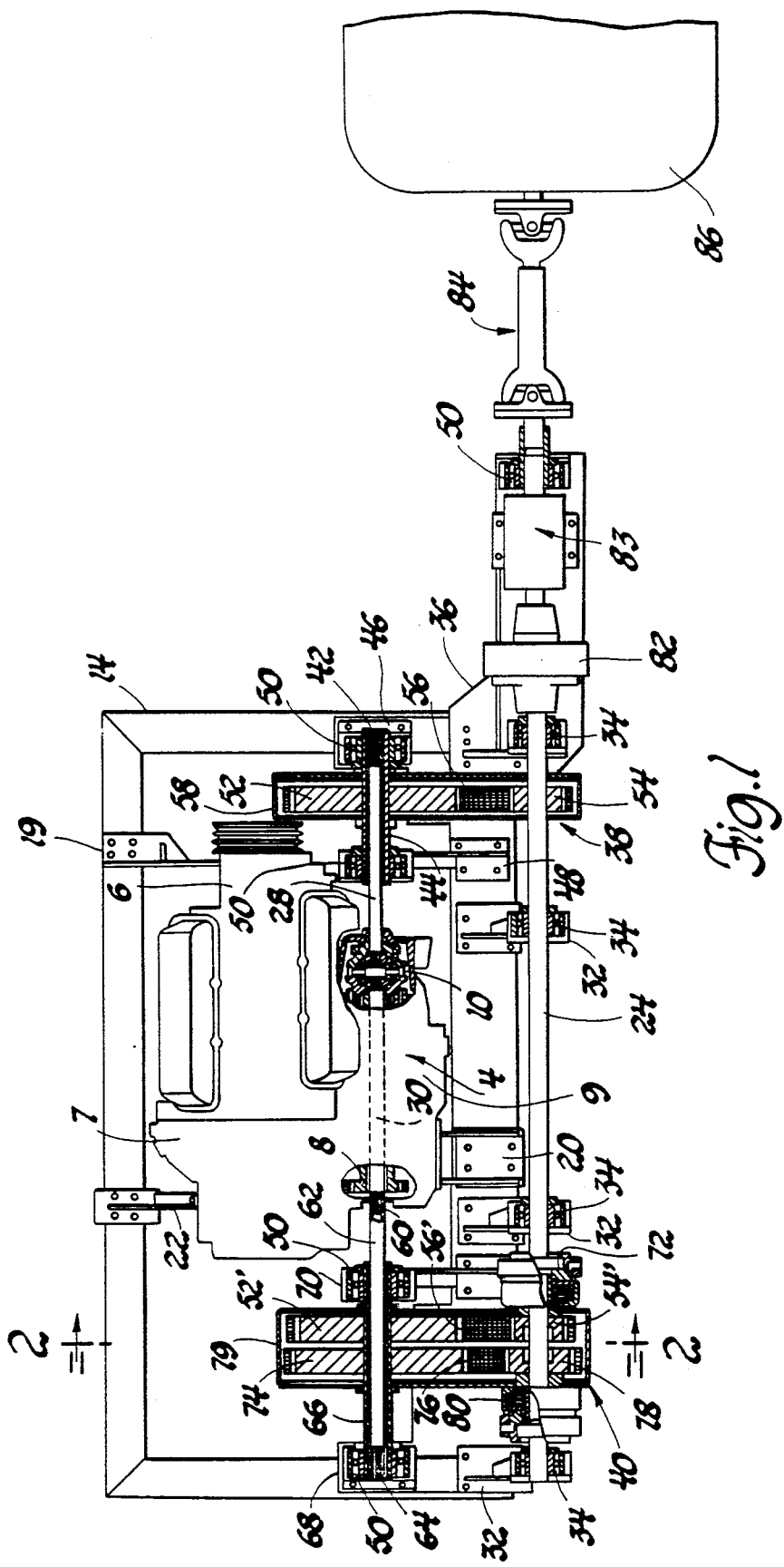
FIG. 1 is a plan view with parts broken away of the preferred embodiment of the vehicle drive train test apparatus according to the present invention.
Figure 2:
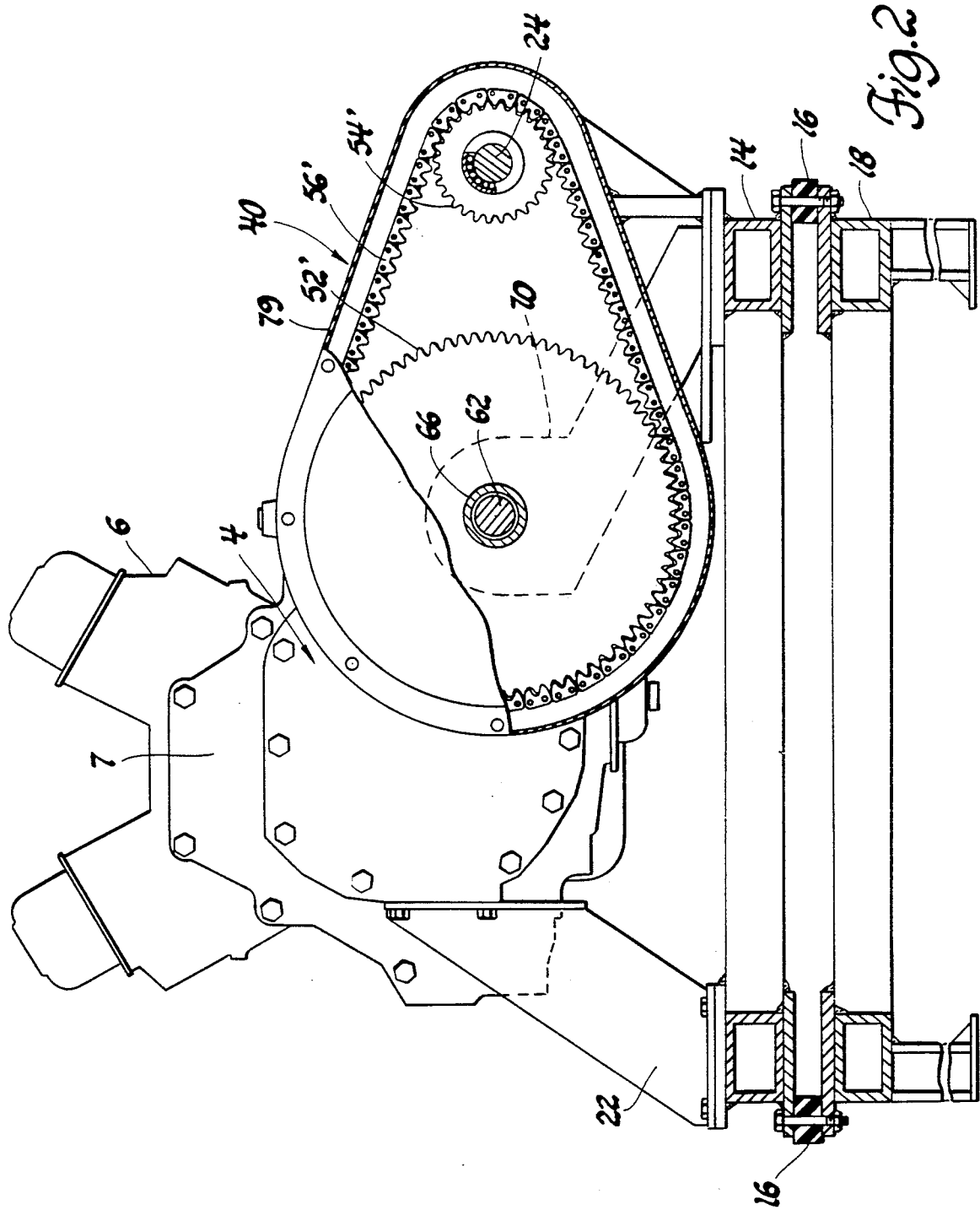
FIG. 2 is an enlarged view taken along the line 2—2 in FIG. 1.

Referring to the drawings, there is shown a vehicle drive train test apparatus according to the present invention adapted to operate for a passenger car automatic transaxle 4 powered by an engine 6 so as to test the automatic transmission fluid used in the transaxle's torque converter section 7, transfer drive 8, transmission section 9 and final drive and differential 10. The test apparatus comprises a frame 14 supported by rubber vibration mounts 16 on a table 18. The frame is adapted to support the engine and transaxle with brackets 19, 20 and 22 and has additionally mounted thereon what will be referred to as a parallel shaft 24 as it is arranged to extend alongside and past the transaxle parallel to the transaxle's oppositely extending coaxial axle shafts 28 and 30. The parallel shaft 24 is supported on the frame 14 by three identical support brackets 32 each with a small pillow block 34 and by a torque sensor and bearing support bracket 36 also with a small pillow block 34 for the shaft. The parallel shaft 24 is selectively and independently connected to the transaxle shafts 28 and 30 by a single-ratio overdrive arrangement 38 and a dual-ratio overdrive arrangement 40, respectively. First as to the single ratio overdrive arrangement 38, the right side axle shaft 28 extends through and is connected at its outboard end by a spline 42 thereon to a hollow sprocket shaft 44 that is rotatably supported on the frame 14 by two support brackets 46 and 48 each with a large pillow block 50. A large sprocket 52 is fixed to the sprocket shaft 44 between its two bearing supports and is aligned with a small sprocket 54 which is fixed to the parallel shaft 24 between its bearing support brackets 32 and 36. An endless chain 56 engages the large and small sprockets 52 and 54 and the chain and sprocket drive is enclosed within a guard cover 58.

Turning next to the dual-ratio overdrive arrangement 40, the left side transaxle shaft 30 is connected at its outboard end by a spline 60 thereon to a jackshaft 62 which extends through and is connected at its outboard end by a spline 64 thereon to a hollow sprocket shaft 66. The sprocket shaft 66 is rotatably supported on the frame 14 by two support brackets 68 and 70 each with a large pillow block 50. Then for one of the two drives in arrangement 40, the right side overdrive chain and sprocket drive is duplicated on the left side with a large sprocket 52', small sprocket 54' and chain 56'. On the left side, the large sprocket 52' is fixed to the sprocket shaft 66 intermediate the bearing supports 68 and 70 while the small sprocket 54' is rotatably mounted (not fixed) on the parallel shaft 24 between its two bearing supports 32 adjacent its left end. The sprocket 54' instead of being fixed to the parallel shaft 24 ia selectively coupled thereto by a hydraulic or air operated disk clutch 72. Then outboard this selective drive there is provided another selective overdrive but with a lower overdrive ratio such as 2.7:1 where the fixed right side overdrive and first-mentioned selective overdrive on the left side are both provided with a 3:1 ratio. This latter drive comprises a large sprocket 74 which is fixed to the sprocket shaft 66 intermediate the sprocket 52' and bearing support 68. The sprocket 74 is engaged by an endless chain 76 which also engages a small sprocket 78that is rotatably mounted on the parallel shaft 24 intermediate the sprocket 54' and the left-most bearing support 32. Both the left side chain and sprocket drives are enclosed within a guard cover 79 and similar to sprocket 54', the sprocket 78 is selectively coupled to the parallel shaft 24 by a hydraulic or air operated disk clutch 80.

Thus, when the clutch 72 is engaged with the engine 6 running, both the axle shafts 28 and 30 are caused to turn in the same direction at the same speed to thereby simulate a car driving in a straight line (no differential gear action) while they drive the parallel shaft 24 at a higher speed with for example, the 3:1 speed up ratio mentioned earlier. To then simulate a car turning (differential gears working), each axle shaft 28 and 30 is caused to turn in the same direction but at a different speed simply by disengaging clutch 72 and engaging clutch 80 while the parallel shaft 24 continues to be driven at a higher speed but now with a 2.7:1 speed up ratio on the left side while the higher 3:1 ratio overdrive remains on the right side. The parallel shaft 24 is thus driven with an effective overdrive ratio intermediate the given ratios by the axle shafts 28 and 30 while they are forced to turn in the same direction with a speed difference of about 10% to in turn force limited differential gear action. This limited speed difference has been found satisfactory in fairly demonstrating the ability of automatic transmission fluid to adequately lubricate the parts of a passenger car differential.

The parallel shaft 24 is connected through a flexible coupling 82 and a torque sensor 83 to a propeller shaft assembly generally designated as 84 which at one end is mounted in a large pillow block 50 on the bracket 36 and is connected at its other end to an electric dynamometer 86 that is operable to simulate the inertia of a vehicle. However, it will be understood that other types of dynamometers may be used such as a hydrodynamic one or simply a flywheel to simulate the vehicle inertia or some other load.

It will also be appreciated that the use of the speed up ratios to increase the speed of the parallel shaft 24 decreases the torque on the parallel shaft which is an important advantage because dynamometers typically do not absorb high horsepowers at low speeds. As a result of the increase in speed, the dynamometer 86 can absorb higher horsepower in the testing of the transaxle. In addition, the decrease in the parallel shaft torque permits reducing the size of the shaft and the other drive system components and thereby their cost. Another feature of the transaxle test set up is that a transaxle can be installed and/or removed without disturbing the engine and drive system. For example, to remove the transaxle from the test set up, the inter-shafts 28 and 62 and transaxle mounting brackets 20 and 22 are removed, the transaxle is unbolted from the engine which is then temporarily supported while the transaxle is lowered through the frame and its table to the floor.

Furthermore, it will be appreciated that while the test apparatus shown is particularly adapted for testing the automatic transmission fluid used in transaxles, such test apparatus is also readily suited to testing other types of vehicle drive trains where differential action is required and for other test purposes such as wear rates, fatigue strengths, etc.

The above described embodiment is thus illustrative of the invention which may be modified within the scope of the appended claims.

The embodiments of the invention in which an exclusive property or privilege is claimed are defined as follows:

1. Test apparatus for selectively operating a drive train including a differential to drive a pair of shafts with and without differential action comprising a test load, first overdrive means adapted to connect one of said shafts to drive said load with a predetermined overdrive ratio, and selectively engageable second overdrive means adapted to selectively connect the other of said shafts to drive said load with a predetermined overdrive ratio equal to said first-mentioned overdrive ratio and, alternatively, with a different overdrive ratio whereby said load is connectable to be driven by said differential at a faster speed than said shafts with and alternatively without forced differential action by selective operation of said second overdrive means.

2. Test apparatus for selectively operating a vehicle drive train including a differential to drive a pair of coaxially arranged axles with and without differential action comprising a test load, a shaft connected to said load and adapted to extend past said differential and parallel to said axles, single ratio overdrive means adapted to continuously connect one of said axles to drive said shaft with a predetermined overdrive ratio, and selectively engageable multi-ratio overdrive means adapted to selectively connect the other of said axles to drive said shaft with a predetermined overdrive ratio equal to said first mentioned overdrive ratio and, alternatively, with a different overdrive ratio whereby said load is connectable to be driven by said differential at a faster speed than said axles with and alternatively without forced differential action by selective operation of said multi-ratio overdrive means.

* * * * *